United States Patent [19]
Nixon et al.

[11] Patent Number: 5,694,457
[45] Date of Patent: Dec. 2, 1997

[54] METHOD OF SUPPORTING UNIFORM ADDRESSING OF TELEPHONE NUMBERS

[75] Inventors: Toby L. Nixon, Kirkland, Wash.; Robert M. Frankston, Newton Heights, Mass.

[73] Assignee: Microsoft Corporation, Redmond, Wash.

[21] Appl. No.: 354,919

[22] Filed: Dec. 13, 1994

[51] Int. Cl.$^6$ .................................. H04M 11/00
[52] U.S. Cl. ..................... 379/100; 379/355; 358/440
[58] Field of Search ..................... 379/100, 98, 216, 379/355, 356, 357, 97, 93; 358/440

[56] References Cited

U.S. PATENT DOCUMENTS 5,189,695  2/1993  Maei ........................... 379/100
5,241,589  8/1993  Jefferson ..................... 379/216
5,455,858  10/1995  Lin ............................ 379/216
5,475,743  12/1995  Nixon et al. ................. 379/355

*Primary Examiner*—Stella Woo
*Attorney, Agent, or Firm*—Klarquist Sparkman Campbell Leigh & Whinston, LLP

[57] ABSTRACT

A method for supporting uniform addressing of telephone numbers includes constructing a fully qualified number including all numbers necessary to place a telephone call regardless of where the call originates. An electronic dialing device automatically dials the fully qualified number and may also communicate with a system for electronically storing and retrieving fully qualified numbers. A call processor in the telephone system includes support for identifying and processing the fully qualified number.

18 Claims, 2 Drawing Sheets

METHOD OF SUPPORTING UNIFORM ADDRESSING OF TELEPHONE NUMBERS

FIELD OF THE INVENTION

The invention generally relates to telephone communication, and more specifically relates to a technique for simplifying telephone dialing using uniform addressing.

BACKGROUND

Dialing long distance phone numbers can be very frustrating. Callers who place long distance calls from a variety of locations have to keep track of area codes and potentially city or country codes just to dial a single phone number. Depending on where a caller originates a call, the phone number ranges from a simple subscriber number to a longer combination of area and country codes. For instance, a long distance call within the same area code may require the addition of a 1 or area code. A long distance call outside the area code requires the caller to keep track of the area code. For international calls, the caller may have to add complex city and country codes.

Today's advanced telephone equipment can alleviate the burden of having to retrieve and dial telephone numbers. Computer systems with modems, telephones, fax machines, and a variety of other telephone communication devices may be programmed to store and dial numbers. These devices, however, do not eliminate the burden of having to keep track of and selectively dial the appropriate number when a caller wishes to originate a call from a variety of locations.

Accordingly, telephone numbers could be simplified significantly by adopting some form of uniform addressing of telephone numbers. Uniform addressing would simplify telephone dialing because the same number could be used to identify a telephone address, regardless of where the call to that address originates. Unfortunately, uniform addressing is not currently supported in the telephone system.

SUMMARY OF THE INVENTION

To address the need for a more simplified telephone dialing, the invention provides a method for providing support for uniform addressing of telephone numbers. In one embodiment, the method includes supporting uniform addressing in the existing telephone system using an access number to access a long distance carrier. An electronic dialing device such as a modem or telephony card for a computer can be used to electronically dial the access number and thereafter to transmit a uniform address in the form of a "fully qualified" number. The access number provides access to a call processor in the long distance network that is capable of processing a fully qualified number. In response to a call directed to the access number, the call processor sends a signal back to the dialing device indicating that it is prepared to receive the fully qualified number. The dialing device then sends the fully qualified number, and the call processor interprets the fully qualified number and directs the call appropriately.

In another embodiment, the fully qualified number may be dialed with a code to identify the fully qualified number format. As in the embodiment summarized above, an electronic dialing device may be used to dial the fully qualified number. However, instead of using an access number, the dialing device transmits a code such as a dialing prefix to identify that the number is in the fully qualified format. The call processor then interprets the fully qualified number and directs the call appropriately.

By supporting uniform addressing in the phone system, the invention simplifies telephone dialing, especially for callers who originate calls from a variety of different locations. With uniform addressing, the problem of keeping track of the correct dialing sequence for a call is eliminated and long distance calling is made much easier. Electronic directories of fully qualified numbers can be developed that may be used anywhere without having to modify the numbers for long distance or local calls. Since the invention provides support for uniform addressing in the existing phone system, the invention is easier to implement and more widely useful for existing telephone communication devices.

Further advantages and features of the invention will become apparent from the following description and reference to the accompanying drawings.

DETAILED DESCRIPTION

Figure 1:
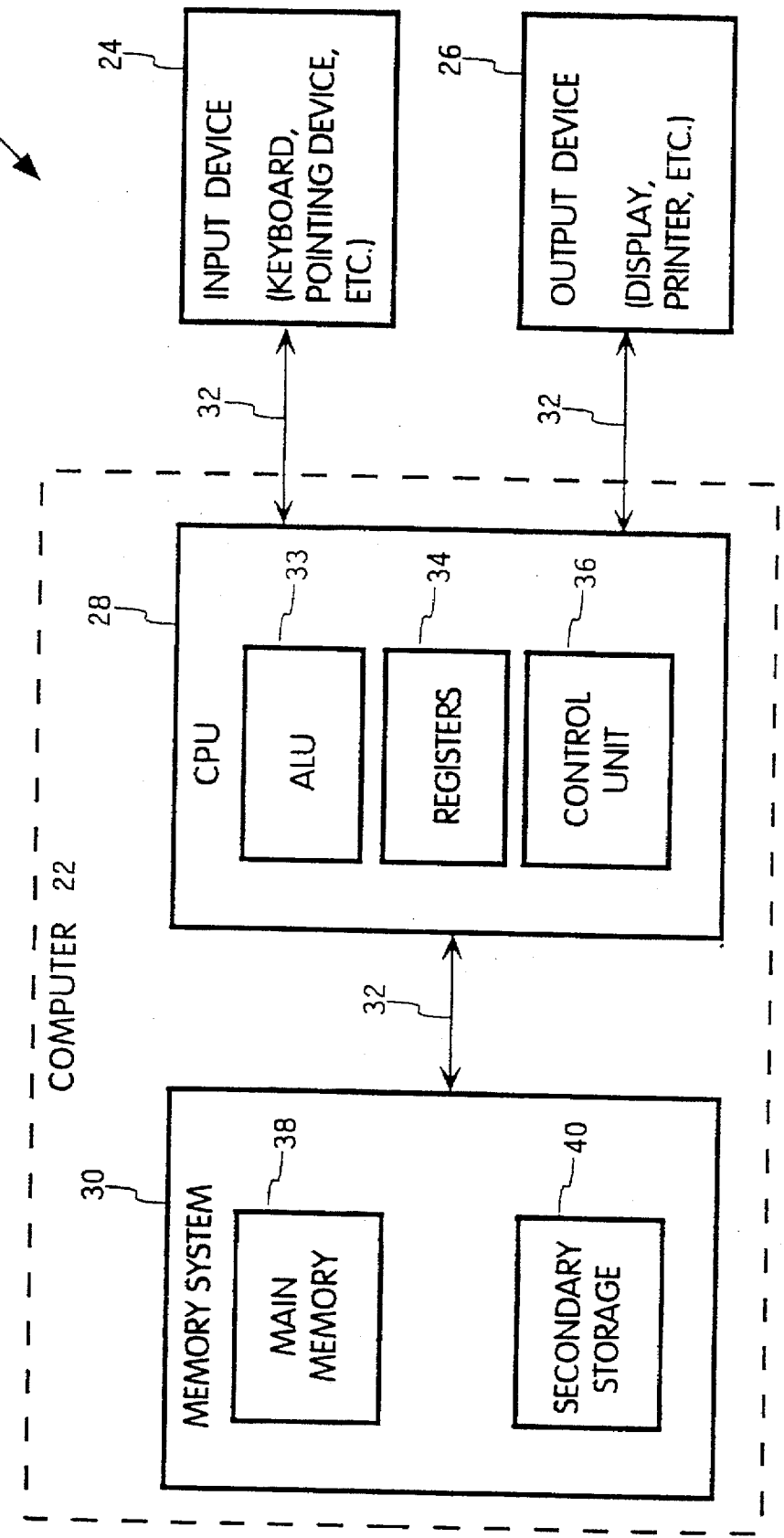
FIG. 1 is a block diagram of a computer system that may be used to electronically store and dial fully qualified telephone numbers.

The invention provides a method for supporting uniform addressing of telephone numbers. To solve problems associated with confusing dialing prefixes, the invention provides a uniform address for a telephone number, termed a "fully qualified number." The invention can be implemented in a variety of applications where the fully qualified number is dialed electronically. Since the existing phone system does not currently support a fully qualified number format, ancillary support must be provided to place calls dialed in this format.

The following description begins with a discussion of the fully qualified number. Next, the description explains systems for electronically dialing fully qualified numbers. Finally, the description explains alternatives for supporting fully qualified number calls in the telephone system.

The invention addresses the problems associated with complex dialing prefixes using a "fully qualified number." A fully qualified number is a telephone number including all of the information necessary to identify the number for any type of call whether the call originates locally, outside the area code, or outside the country. Specifically, the fully qualified number includes the country code, area code and subscriber number (e.g.: <cc><ac><sn>). This information is sufficient to originate a call to the subscriber number from virtually anywhere in the world. The fully qualified number provides uniform addressing for a subscriber number, meaning that regardless of where a call originates, the dialing sequence for the call remains the same.

While uniform addressing can simplify dialing in a variety of applications, it is particularly useful in the context of telephone communication systems supporting electronic storage, retrieval, and electronic dialing of fully qualified numbers. In such systems, it is more convenient to represent telephone numbers uniformly. Uniform addressing eliminates the need for callers to maintain information about dialing codes either in their own minds or in memory of the telephone device or computer they are using. Callers can maintain electronic directories of fully qualified numbers that are valid in any location.

Though the fully qualified number contains a longer string of digits, the number of digits presents no difficulty to an electronic dialing device capable of dialing a fully qualified number very quickly. To initiate a call, a user selects a number, perhaps by selecting a name from an electronic directory, and then instructs the system to dial the fully qualified number automatically.

A number of systems can benefit from uniform addressing described above. For example, personal computers equipped with fax and/or data modems can be programmed to maintain an electronic directory and to dial fully qualified numbers. Uniform addressing can also be used in specialty phones capable of storing and dialing fully qualified numbers. Uniform addressing is particularly useful in notebook and other portable computer systems where a user may likely originate a call from different locations. An electronic directory can be maintained in a portable form by storing it on a floppy disk, PCMCIA card or other such storage media. A user can then take the electronic directory anywhere and use a computer programmed to control a phone or modem to dial a fully qualified number. Such technology can be incorporated into a specialty phone capable of reading a floppy disk or PCMCIA card, for example, and then dialing a number selected from the directory.

FIG. 1 illustrates a general block diagram of a computer system 20 that can be programmed to control the dialing of fully qualified numbers. The computer system 20 may be loaded with an application program to control the dialing of a fully qualified number through a modem. The general nature of the diagram emphasizes the wide array of systems that can be adapted to support fully qualified number dialing. For instance, while the drawing illustrates a general diagram of a computer system, similar support for qualified dialing can be placed in a specialty phone called a "smart phone" as well as a variety of other telephone communication devices.

Computer system 20 includes as its basic elements a computer 22, input device 24 and output device 26. Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions, and a control unit 36 for controlling the operation of computer system 20 in response to instructions from a computer program, such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, pointing device, pen, or other device for providing input data to the computer. Output device 26 may be a display device, printer, sound device or other device for providing output data from the computer.

A modem can serve as both an input and output device 24, 26. As an output device, the modem may receive commands and data from memory under the control of the programmed CPU. As an input device, the modem can receive fax or computer data and transfer this data to memory for further processing or storage. The modem can support data, fax, or voice calls, or even a combination of these types in a single call. If the computer system is coupled to a telephone, the computer can initiate a voice call by dialing the telephone number. The caller would then carry on voice communication through the handset of the phone once communication is established. For switched voice and data communication, the modem can initiate a voice communication and establish communication between computers. It should be understood by those of ordinary skill in the industry that many modes of telephone communication through a modem are possible.

To control the modem, the computer system typically transfers commands and data between memory and the modem using a combination of a communication program and a device driver. The communication program passes high level control and data signals to the device driver. The device driver then translates data into a format understood by the modem. Many configurations of communication and driver programs are possible. For example, a communication program may include code specifically designed to control specific types of modems based on the commands supported by the modems. The communication program then communicates with a port driver to transfer commands and data to the modem. Alternatively, a communication program may pass high level commands and data through a series of lower level drivers, such as a modem device driver designed to control a specific type of modem and a port driver.

The computer system typically controls a modem with a communication program, a software program loaded into memory that enables the computer to dial phone numbers and connect with another computer to exchange information. A typical communication program performs such tasks as maintaining settings (such as modem speed, parity, and handshaking) required to establish a viable connection between computers and storing and dialing phone numbers to initiate communication. During communication, the program can encode data and coordinate transmissions to and from a distant computer.

The process of physically transferring commands and data to the modem varies depending on the type of modem. Various standard modem configurations exist and are well-known in the field. These configurations may include, for example, an internal or external modem, or a PCMCIA card connection popular in notebook computers. An "internal" modem may be coupled to the computer through a bus structure 32 such as an Industry Standard Architecture (ISA) bus, Expanded Industry Standard Architecture (EISA) bus, or Micro Channel Architecture (MCA) bus. A modem may also be coupled to the bus structure 32 of the computer through a PCMCIA port. Alternatively, an "external" modem may be coupled to the bus structure 32 of the computer through an RS-232 serial port. Many other variations are possible and are well-known to those of skill in the art.

It should be understood that FIG. 1 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

A computer system coupled to a modem can support electronic dialing of a fully qualified number. As described above, a communication program may be used to control the dialing of a modem. The Hayes Standard AT Command Set is a widely used and well-known set of commands for controlling Hayes compatible modems. Developers of communication programs can use these commands to control the dialing of a modem. For example, the following sequence of commands and digits represents a typical dialing instruction: "ATDT18005551212W". "AT" identifies the following command as an AT command. The "D" command places the modem in a mode to originate ("dial") a call, and the modem becomes an auto-dialer. "T" is a dial modifier that instructs the modem to use tone dialing. "18005551212" is the sequence of digits to be dialed. Finally, "W" instructs the modem to wait for tone.

While AT commands are commonly used in connection with modem communication, it should be understood that they are but one of several possible alternatives for providing electronic dialing. An electronic dialing capability may be built into a phone such as a smart phone. A telephony card for a computer is another example of an electronic dialing device. Fax machines also have built in electronic dialing devices. A hand-held device that electronically dials telephone numbers by placing it in proximity to a telephone handset is yet another example.

In addition to dialing a fully qualified number, another useful feature of a communication system is the capability to electronically store and retrieve fully qualified numbers. Many of the devices discussed above provide this capability. For instance, computers, smart phones, and fax machines generally include this capability.

A computer system, such as shown in FIG. 1, may be used to electronically store and retrieve fully qualified numbers. A communication program can maintain a list of numbers in a file in memory. There are a number of commercially available programs that can store and dial lists of phone numbers. Such programs include for example, Dialer from Microsoft Corporation of Redmond, Wash., Smartcom for Windows from Hayes Microcomputer Products, Inc. of Norcross, Ga., or Procomm Plus for Windows from Datastorm Technologies of Columbia, Mo. To retrieve a desired number, the caller selects a number to be dialed from the list through a user interface portion of the communication program. The communication program then reads the number from memory, forms the appropriate command, and instructs the modem to automatically dial the number. Many application programs have this capability and generally known in the field.

Having described both the fully qualified number and systems for dialing such numbers, it is now appropriate to describe methods for supporting a fully qualified number in the telephone system. To support uniform addressing, the telephone system needs to be able to recognize and process fully qualified numbers. The existing phone system is not designed to receive a fully qualified number. Unless a caller dials a number with the appropriate dialing prefix for a type of call, the caller receives an error message. As such, embodiments of the invention include the step of identifying a fully qualified number so that the carrier (e.g. local, regional, or long distance carrier) may process the call.

Figure 2:
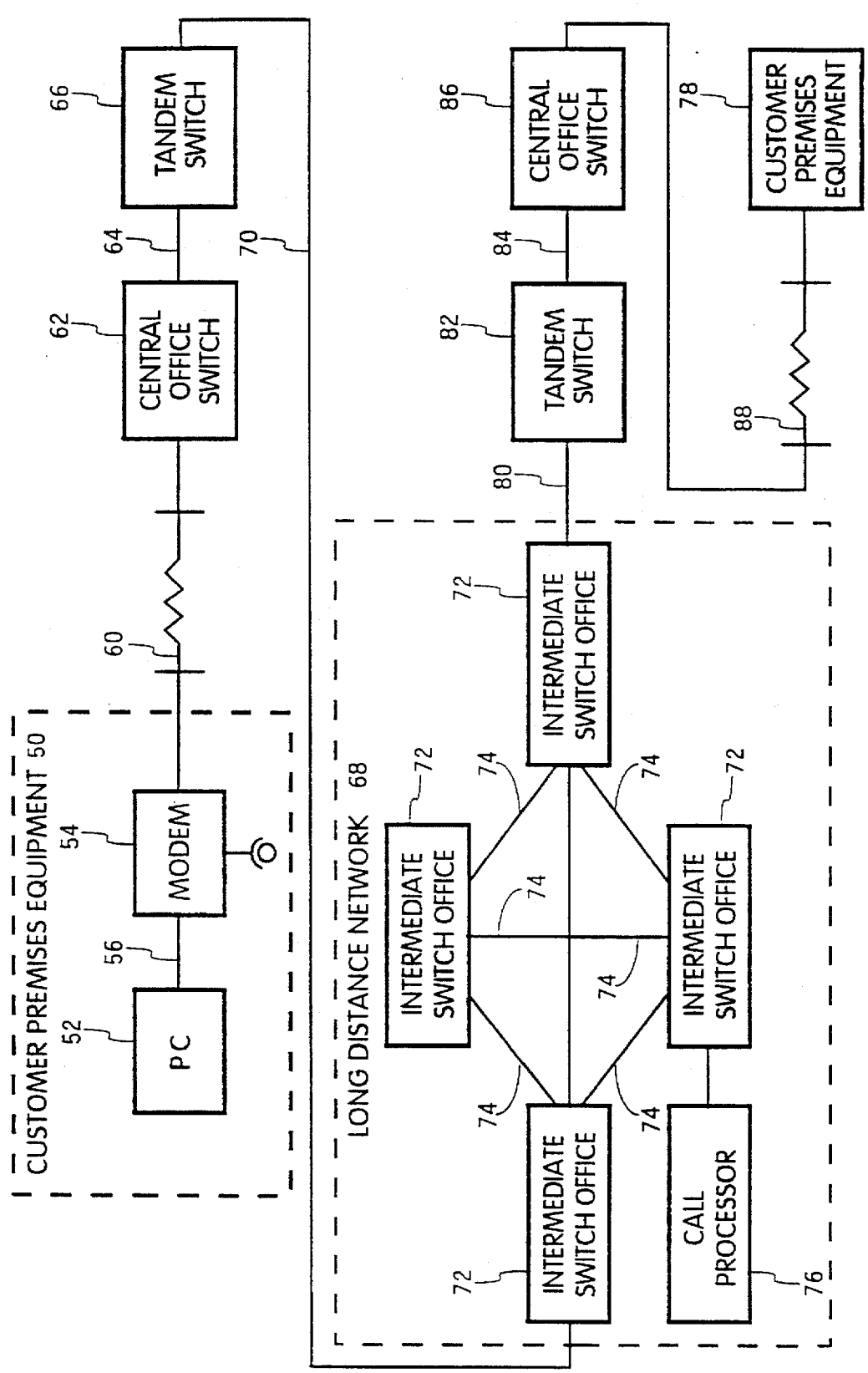
FIG. 2 is a block diagram illustrating how participants in a long distance call may be connected through the telephone system.

Before describing methods for identifying a fully qualified number, it is helpful to provide a description of the telephone system. FIG. 2 illustrates how long distance callers are connected through the telephone system. At each end of the call, the participants in the call have equipment to initiate or receive a call. The name that generally refers to this equipment is "customer premises equipment." Customer premises equipment 50 may include a variety of devices such as a standard analog phone, a personal computer equipped with a modem, a fax machine, or a smart phone, to name a few. An example, shown in FIG. 2, is a PC 52 coupled to a modem 54 through an RS-232 cable 56 coupled to a serial communication port of the PC 52. A telephone 58 may also be coupled to the modem 54.

The modem 54 is coupled to the local telephone network through a telephone line 60. The telephone line 60 connects the modem 54 to a central office switch 62. Through a trunk line 64, the central office switch 62 is coupled to a tandem switch 66. Similarly, the tandem switch 66 is coupled to switches in the long distance network 68 through a series of high bandwidth trunk lines 70.

The long distance network 68 consists of a network of intermediate switch offices 72 interconnecting a number of high bandwidth trunk lines 74. Call processors 76, such as the one illustrated in FIG. 2, are coupled to the intermediate switch offices for controlling long distance telephone communication. Though shown coupled to an intermediate switch office, the call processor can be implemented in any of several places in the network, but is most likely implemented either: a) in an auxiliary system which is part of the long distance network 68, accessed via a special phone number (like an 800 number), or b) within the central office switch 62 to which the customer premises equipment 50 is attached. The call processor 76 can be integrated into the regular switching processors used to control and route telephone calls. When programmed in a conventional manner, the switching processor serves as a call processor 76, accepting the fully qualified number and converting it into the necessary signals and messages to route the call through the telephone network.

At the other end of the call, the customer premises equipment 78 is coupled to the long distance network in the same fashion. Specifically, a series of high bandwidth trunk lines 80 couple a tandem switch 82 to intermediate switch offices 74 in the long distance network 68. A trunk line 84 couples the tandem switch 82 to a central office switch 86 in the local telephone network. The telephone line 88 couples the central office switch 86 to the customer premises equipment 78.

The manner in which the telephone system processes a call depends on the type of call. For local calls a central office switch 62 or tandem switch 66 (in some cases the central office switch and tandem switch can reside in the same location) establishes the connection between participants in the call. For a long distance call, a tandem switch 66 transfers the call to the appropriate long distance carrier. The long distance carrier then establishes the connection between tandem switches 66, 82 for the call through an intermediate switch office or offices 72 in the long distance network 68. Since the switching offices that comprise the phone system are not presently programmed to process a fully qualified number, a method must be establish to identify and process a number dialed in a fully qualified format.

There are a number of possible methods to identify a fully qualified number so that it may be processed accordingly. In one embodiment, the fully qualified number is identified with a special dialing prefix. This special dialing prefix may include a unique code or combinations of codes. For example, the code may be: a feature activation code such as "*" plus a number or string of numbers; a digit or series of digits followed by the "#" key; a digit or series of digits followed by a pause of predefined duration; the digits 11 followed by one or more additional digits; or the code may be one of the characters: A, B, C, or D. The characters, A–D, are not ordinarily shown on a standard touch tone phone. They do, however, represent valid dual tone multi-frequency (DTMF) signals defined in Recommendation Q.23 of the International Telecommunications Union—Telecommunications Standardization Sector (ITU-T). These signals can be dialed by most modems. One of these codes could be used as a dialing prefix to identify that a fully qualified number is to follow.

The special dialing prefix could be used for dialing telephone calls directly. In this case, the local phone company would support fully qualified number dialing by programming the switches in the local phone network to recognize the special dialing prefix and then process the call accordingly. One way to implement this dialing format is to program the central office and tandem switches 62, 66 to recognize the special dialing prefix and then prepare to receive a fully qualified number in response. If after parsing the number, the number is determined to be in the local network, the central office 62 or tandem switch 66 that received the call could route it directly to the number dialed. If the number is determined to be a long distance number, then the tandem switch could route the call to the appropriate intermediate switch office in the long distance network.

In another embodiment, an access code, such as a "1-800" number, could be established to provide access to a special switch 72 that has a call processor programmed to accept, parse and process fully qualified telephone numbers. In this case, an electronic dialing device, such as a modem or telephony card, dials the access code first, and then sends the fully qualified number. From the access code, the local central office or tandem switch 62, 66 determines which long distance carrier that serves that "1-800" number. The tandem switch 66 then routes the call to that switching office 72 through the appropriate long distance network.

For calls originating overseas, a different access code could be used rather than a "1-800" number. In this case the access number can give the caller access to a call processor located overseas or even in the U.S. telephone network that processes numbers in the fully qualified format. No matter where the call originates, the concept of an access code remains the same. If the caller travels internationally, a few different access codes may be necessary, but this is superior to having to keep track of area codes for each number dialed. An international toll-free number can be used such that a single access code could be used world-wide. The ITU-T is currently standardizing on international toll-free numbers that enable this capability.

Most long distance carriers enable callers to place long distance calls through a "1-800" access number. These services, however, are designed for interaction with human callers. A typical service requires the caller to input information in response to a variety of voice prompts and/or bong tones. This process requires the caller to enter a long series of digits. Moreover, it is not compatible with electronic dialing devices such as modems that are not designed to respond to voice prompts. The support in the long distance network, namely the call processor, is adapted to accept fully qualified numbers transmitted automatically by an electronic dialing device. An electronic dialing device can quickly dial the access code and transfer a fully qualified number along with additional information.

In this embodiment, it is preferable to send the fully qualified number in a single burst of data to decrease the time required to establish a connection. To establish a telephone connection in this context, an electronic dialing device first dials the access code and then waits for a signal to send the fully qualified number. In response to receiving the signal from the call processor 76, the electronic dialing device then sends a string of numbers in a single burst of data.

In the specific case of a modem, the modem automatically dials the access code (e.g. "1-800" number) and then waits for the signal. The signal can be a two second dial tone burst or other signal that the modem can detect. Dial tone detection is a feature of commercially available modems such as the Hayes SmartModem products from Hayes Microcomputer Products, Inc. of Atlanta, Ga. After detecting the signal, the modem then transfers the string of numbers representing the fully qualified number in one burst. In addition to the fully qualified number, the modem may also transfer a format code and additional information associated with the call. An additional character such as "#" may be used as a separator to enable the call processor to identify format and billing information apart from the fully qualified number. A separator character should preferably be located after all numbers and codes so that the call processor can detect the end of the string.

The following string is an example string of numbers and characters that may be sent after the signal from the call processor: "1#12345678901111#12068828080#".

Starting from the left, the "1" is a format code. The "#" character separates the format code from an account number, "12345678901111", used for billing purposes. The next "#" character separates the account number from the fully qualified number, "12068828080". The final "#" character identifies the end of the string.

Format codes can be used to identify additional information about the call. The format code can be one or more digits or characters and may be placed anywhere in the string. It is preferable, however, to use a separator character to enable the call processor to interpret the string properly.

The format code can identify the type of call, such as a fax, voice or data call. By identifying the type of call, the information in the call can be treated appropriately. This is important because the mode in which the data is transfered can be optimized for a particular data type, i.e. fax, voice, or data. For a voice call, for example, data compression may be used that would not be appropriate for a fax call. Without pre-identification of the type of call, a default mode is used to initially transfer data. Later, the carrier may switch the mode if it can detect the type of call. Switching modes in this way is often not desirable because some data may be clipped in the switching process. The format code can eliminate the need for this switching by identifying the data type of the call before any data is transferred.

Format codes can also identify billing information. In the above example, only an account number is included. Where the caller wishes to track additional billing information, however, another format code could specify a format for including such information as a client and matter identification.

In ISDN (Integrated Service Digital Network) systems, a format code can be used to identify ISDN sub-addresses. These addresses can be used to specify a device to ring at telephone number where several communication devices are associated with the same line.

The process of dialing an access code and then sending a burst of data can also be extended to wireless, DTMF based message communication. In these systems, a user dials an access number, an addressee identification code of the one to be paged, and then enters a message by pressing keys on a touch tone phone. Since the keys correspond to letters, the user is able to enter a message including text. At the receiving end, the pager has a display screen for displaying this message.

An alternative use of one aspect of the invention provides an easier method for accessing an addressee or addressees of a page and for sending the DTMF message. An electronic dialing device can be used to auto-dial an access number, and then send an addressee identification and message information in a single burst. This system can be implemented in a computer system coupled to a modem, a smart phone, or any of number of automated dialing devices.

For example, using a smart phone, a user selects an addressee from a stored list of addressees, enters a message, and then enters a command to dial the access code and send the message automatically. The smart phone then dials the access number, and waits for a signal to send the data in a burst. In response to the signal from a call processor supported by the paging system, the smart phone then sends the addressee information and the message information in a single burst. A separator such as the "#" key could be inserted to separate the addressee identification and message information.

In this discussion, various alternatives have been suggested. However, it should be understood that the description of alternatives is not meant to be a comprehensive listing, but rather, exemplary of the possible variations of the invention.

In view of the many possible embodiments to which the principles of our invention may be put, it is emphasized that the detailed embodiments described herein are illustrative only and should not be taken as limiting the scope of our invention. Rather, we claim as our invention all such embodiments as may come within the scope and spirit of the following claims and equivalents thereto.

We claim:

1. A method for placing a telephone call between a caller at a first location and a callee at a second location through a telephone network using uniform addressing of telephone numbers, the method comprising:

dialing an access number with an electronic dialing device to establish a telephone connection with a call processor, wherein the call processor is in communication with a switching office in the telephone network, and the call processor is adapted to receive telephone calls directed to the access number;

after establishing the telephone connection between the electronic dialing device and the call processor, waiting for a signal from the call processor to send a fully qualified number representing a uniform dialing address for the callee;

in response to receiving the signal from the call processor, transmitting the fully qualified number to the call processor regardless of the locations of the caller and callee;

after receiving the fully qualified number in the call processor, routing the telephone call to the callee using the fully qualified number.

2. The method of claim 1 further including the steps of:
   providing an electronic directory for storing fully qualified phone numbers, a programmed data processor for retrieving a fully qualified number from the electronic directory and for controlling the dialing of a telephone number with the electronic dialing device, and an input device coupled to the programmed data processor;

selecting a fully qualified number in the electronic directory using the input device;

retrieving the fully qualified phone number from the electronic directory with the programmed data processor; and dialing the access number using the electronic dialing device under the control of the programmed data processor.

3. The method of claim 2 further including the steps of using the input device to enter a fully qualified number into memory of the programmed computer system.

4. The method of claim 1 wherein the transmitting step includes sending the fully qualified number in a single burst to the call processor with the electronic dialing device.

5. The method of claim 1 wherein the signal from the call processor is a tone detectable by a modem identifying that the call processor is prepared to receive the fully qualified number.

6. The method of claim 1 further including the steps of:
   transmitting a format code to identify the type of call to be established after receiving the signal from the call processor; and
   converting a data transfer mode of a carrier for the telephone call to a data transfer mode compatible with the type of call identified by the format code.

7. The method of claim 1 further including the step of transmitting a format code to identify the format of the information to be included with the fully qualified number.

8. The method of claim 7 wherein the format code identifies a billing format.

9. The method of claim 7 wherein the format code identifies that an ISDN sub-address is included with the fully qualified number.

10. A method for placing a telephone call between a caller at a first location and callee at a second location using uniform addressing of telephone numbers, the method comprising:

automatically dialing a fully qualified number with an electronic dialing device including:
       sending a code with the electronic dialing device indicating that the number to follow is a fully qualified number;
       waiting for a response signal from a call processor indicating that the call processor is ready to receive the fully qualified number, wherein the call processor is programmed to receive the fully qualified number representing a uniform address of the callee and is programmed to control routing of the telephone call to the callee using the uniform address; and
       transmitting the fully qualified number with the electronic dialing device regardless of the locations of the caller and callee.

11. The method of claim 10 wherein the code is a dual tone multi-frequency code and the call processor is in communication with a switching office in the local phone system for receiving and interpreting the fully qualified number in response to the dual tone multi-frequency tone code being received in the switching office.

12. The method of claim 10 wherein the transmitting step includes sending the fully qualified number as a single block of data.

13. The method of claim 10 wherein the call processor is in communication with a switching office in the long distance telephone network for receiving and interpreting a fully qualified number, and further including:

automatically dialing a long distance access number with an electronic dialing device to gain access to the call processor; and waiting for a signal detectable by the electronic dialing device indicating that the call processor is prepared to receive the fully qualified number.

14. A computer having fax or modem circuitry, the computer further including software causing the computer and circuitry to cooperate to perform the following steps:

dialing a preselected access telephone number;

detecting a response prompt after the access telephone number connects;

after the response prompt, sending a continuous sequence of digits and separation tones without pauses or interruptions to listen for prompts, the continuous sequence including an addressee telephone number comprising at least an area/city code, and a subscriber number, the continuous sequence further including billing data;

detecting a connect tone from the addressee telephone number; and conveying fax or modem data.

15. The invention of claim 14 in which the addressee telephone number includes a country code.

16. The invention of claim 14 in which the billing data includes a telephone credit card number.

17. The invention of claim 14 in which the software inserts data in the burst identifying the type of data that will be conveyed.

18. A computer-readable medium having computer-executable instructions for performing steps comprising:

instructing an electronic dialing device to dial a preselected access telephone number;

detecting a response prompt after the access telephone number connects;

after the response prompt, instructing the electronic dialing device to send a continuous sequence of digits and separation tones without pauses or interruptions to listen for prompts, the continuous sequence including an addressee telephone number comprising at least an area/city code, and a subscriber number, the continuous sequence further including billing data;

detecting a connect tone from the addressee telephone number; and conveying fax or modem data.

\* \* \* \* \*

UNITED STATES PATENT AND TRADEMARK OFFICE
CERTIFICATE OF CORRECTION

PATENT NO. : 5,694,457
DATED : December 2, 1997
INVENTOR(S) : Nixon, et. al.

It is certified that error appears in the above-indentified patent and that said Letters Patent is hereby corrected as shown below:

Column 5, line 18, "wait for tone" should read --wait for a dial tone--.

Column 9, line 54, "gualified" should read --qualified--.

Column 10, line 56, "multi-freguency" should read --multi-frequency".

Column 10, line 59, "multi-freguency" should read --multi-frequency--.

Signed and Sealed this

Twenty-eighth Day of July, 1998

Attest:

BRUCE LEHMAN

*Attesting Officer*   *Commissioner of Patents and Trademarks*